(12) United States Patent
Warren

(10) Patent No.: US 8,323,388 B1
(45) Date of Patent: Dec. 4, 2012

(54) COMBINATION RELIEF VALVE AND FILTRATION SYSTEM

(75) Inventor: Charles Warren, Azle, TX (US)

(73) Assignee: Warr-Z-Bros, LLC, Huntsville, TX (US)

( * ) Notice: Subject to any disclaimer, the term of this patent is extended or adjusted under 35 U.S.C. 154(b) by 190 days.

(21) Appl. No.: 12/889,106

(22) Filed: Sep. 23, 2010

(51) Int. Cl.
*B01D 53/02* (2006.01)
*B01D 46/00* (2006.01)

(52) U.S. Cl. ............. 96/134; 96/147; 55/310; 55/385.4; 55/505

(58) Field of Classification Search ................. 55/385.3, 55/505, DIG. 17, DIG. 30, 310, 313, 319, 55/309, 350.1, 490, 273; 95/279, 273; 96/416, 96/118, 149; 60/311; 123/198 E, 434; 137/2, 137/223, 544, 549; 417/313
See application file for complete search history.

(56) References Cited

U.S. PATENT DOCUMENTS

| | | | |
|---|---|---|---|
| 5,046,308 A * | 9/1991 | Longobardi et al. ............ | 60/311 |
| 5,195,587 A | 3/1993 | Webb | |
| 5,522,910 A * | 6/1996 | Fogal, Sr. ......................... | 55/505 |
| 6,284,026 B1 * | 9/2001 | Lai .................................... | 96/416 |
| 6,684,945 B1 | 2/2004 | Meyers | |
| 6,726,456 B2 * | 4/2004 | Hayashi et al. ................ | 417/313 |
| 7,273,514 B2 * | 9/2007 | Bailey et al. ..................... | 95/279 |
| 7,350,581 B2 | 4/2008 | Wynn | |
| 2004/0139708 A1 * | 7/2004 | Giacinto ...................... | 55/385.3 |
| 2007/0186770 A1 | 8/2007 | Heath | |
| 2010/0095845 A1 | 4/2010 | Mok | |
| 2011/0094593 A1 * | 4/2011 | Malm ................................ | 137/2 |

FOREIGN PATENT DOCUMENTS

CN         101525989         9/2009

OTHER PUBLICATIONS

Enardo Data Sheet; published; www.enardo.com; date: unknown; author: unknown.

* cited by examiner

*Primary Examiner* — Duane Smith
*Assistant Examiner* — Minh-Chau Pham
(74) *Attorney, Agent, or Firm* — Eric Karich

(57) ABSTRACT

A filtration system has a filter housing, a pollution filter, and a connection conduit. The filter housing has an inlet chamber having openings. The pollution filter is positioned within the filter housing adjacent the inlet chamber to cover the openings. The connection conduit connects the filter housing with a relief valve so that gasses vented from a hydrocarbon distribution system through the relief valve are directed into the inlet chamber and through the pollution filter, which removes pollutants from the gasses.

2 Claims, 3 Drawing Sheets

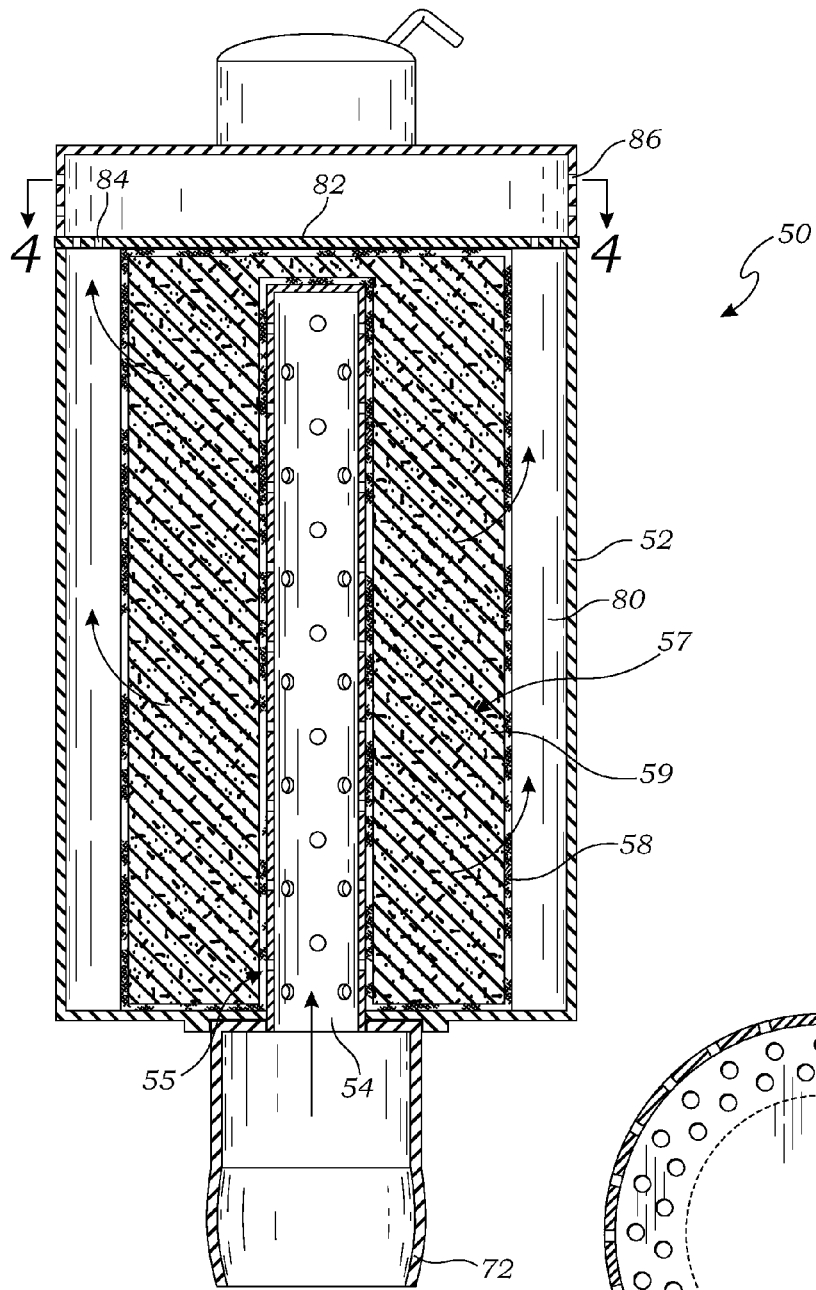
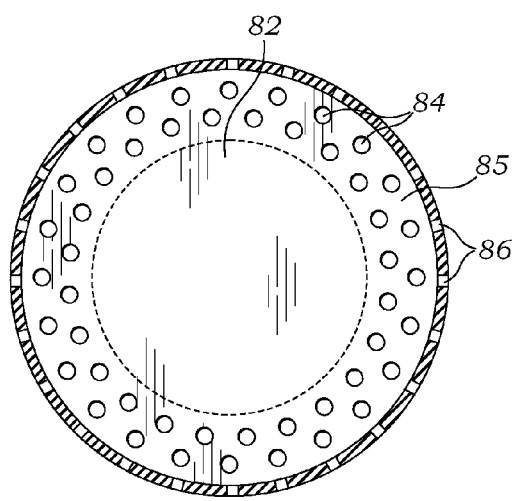
Fig. 3
Fig. 4

COMBINATION RELIEF VALVE AND FILTRATION SYSTEM

BACKGROUND OF THE INVENTION

1. Field of the Invention

This invention relates generally to filtration systems, and more particularly to a combination relief valve and filtration system that enables gasses to vent from a hydrocarbon distribution system while limiting pollution released into the atmosphere.

2. Description of Related Art

A known problem in the art of hydrocarbon distribution (hereby defined to include any form of transportation and storage or hydrocarbons) is that gasses can build up to unacceptably high levels within the hydrocarbon distribution system, and these gasses must be vented to relieve pressure within the system.

Various valves are commonly used in the art to release the gasses once pressure reaches a certain level. A vent valve (e.g., an ENARDO® valve) is commonly used for this purpose, although those skilled in the art may devise many alternative valves that are also acceptable.

A well known problem with venting the gasses is the pollution caused by venting the hydrocarbons, and associated chemicals (e.g., benzene, etc.). The standard solution to the problem of pollution has been to burn the vented gasses. The new and improved systems involve complex systems for capturing, compressing, and utilizing the gas. These types of systems are not practical for small scale releases of gas, such as this invention addresses, such as capturing vented gas from Enardo valves.

Wynn, U.S. Pat. No. 7,350,581, teaches a vapor recovery apparatus for oil and gas well production that is used in combination with a liquid separator, a sales line, a holding tank, and a compressor linked to an engine. A first conduit extends from fluid communication with the holding tank to a compressor inlet, while a second conduit extends from a compressor outlet to fluid communication with the sales line. The vapor recovery apparatus also has an electronic controller that is connected to the engine and to a pressure sensor, which is in fluid communication with the gas in the tank. When the pressure reaches a certain level, the gas is captured and compressed by the compressor, and directed to the holding tank for future use.

Webb, U.S. Pat. No. 5,195,587, teaches in an oilfield production system in which a water driven jet pump is used to evacuate vapors from storage tanks to thereby recover the vapors and prevent emissions from passing to the atmosphere. The jet pump entrains the vapors in process water which is passed to a process separator already in the system. The gas is separated for recovery.

Heath et al., U.S. 2007/0186770, teaches a natural gas well vapor recovery processing system and method that is adapted for recovering gaseous hydrocarbons to prevent their release into the atmosphere. The natural gas is collected and compressed using a compressor for later collection and use.

Mok et al., U.S. 2010/0095845, teaches a vent gas adsorption system and a method of recovering volatile organic compounds (VOCs), more particularly to a vent gas adsorption system devised to effectively adsorb VOCs included in the vent gas and reduce VOC content of the vent gas, and a method of recovering VOCs.

Various forms of filters are, of course, well known. Meyers, U.S. Pat. No. 6,684,945, for example, teaches an air filter for a well is installed within a well casing of the well. The air filter forming an airtight seal around the well casing of the well, such that all the air that enters and exits the well must pass through the air filter. The air filter preferably includes a filter housing, at least one removable gasket and a removable filter cartridge installed within an opening extending through the filter housing. The air filter prevents dirt, dust, bacteria, gaseous chemicals, volatile organic compounds, (VOCs), insects and other air born contaminants from entering and possibly contaminating the well. An air filter may also be installed within a vent pipe extending through a well seal attached to the top of a well casing of a well.

The prior art teaches venting gasses from a hydrocarbon distribution system, and burning such vented gasses. The prior art also teaches collecting the gasses, and compressing them for use. However, the prior art does not teach a combination relief valve and filtration system that enables gasses to vent from the hydrocarbon distribution system through a filter for limiting pollution released into the atmosphere. The present invention fulfills these needs and provides further related advantages as described in the following summary.

SUMMARY OF THE INVENTION

The present invention teaches certain benefits in construction and use which give rise to the objectives described below.

The present invention provides a filtration system adapted to be mounted on a relief valve of a hydrocarbon distribution system for filtering pollutants from vented gasses. The filtration system includes a filter housing, a pollution filter, and a connection conduit. The filter housing has an inlet chamber having openings. The pollution filter is positioned within the filter housing adjacent the inlet chamber to cover the openings, and is adapted to remove the pollutants from the gasses. The connection conduit connects the filter housing with the relief valve so that gasses vented from the hydrocarbon distribution system through the relief valve are directed into the inlet chamber and through the pollution filter.

A primary objective of the present invention is to provide a filtration system having advantages not taught by the prior art.

Another objective is to provide a filtration system that enables gasses to vent from a hydrocarbon distribution system while limiting pollution released into the atmosphere.

Another objective is to provide a filtration system that may be implemented and maintained without great expense, and without great investments in changes to existing systems.

A further objective is to provide a filtration system that may be easily maintained by personnel with minimal skill and expertise, but without danger of exposure of the personnel to the toxic pollutants being removed via the system.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings:

FIG. 3 is a sectional view of the filtration system taken along line 3-3 in FIG. 1; and FIG. 4 is a top plan view of a top plate of the filtration system.

DETAILED DESCRIPTION OF THE INVENTION

The above-described drawing figures illustrate the invention, a combination relief valve and filtration system 10 that is adapted to remove pollutants from gasses being vented from a hydrocarbon distribution system 12.

Figure 1:
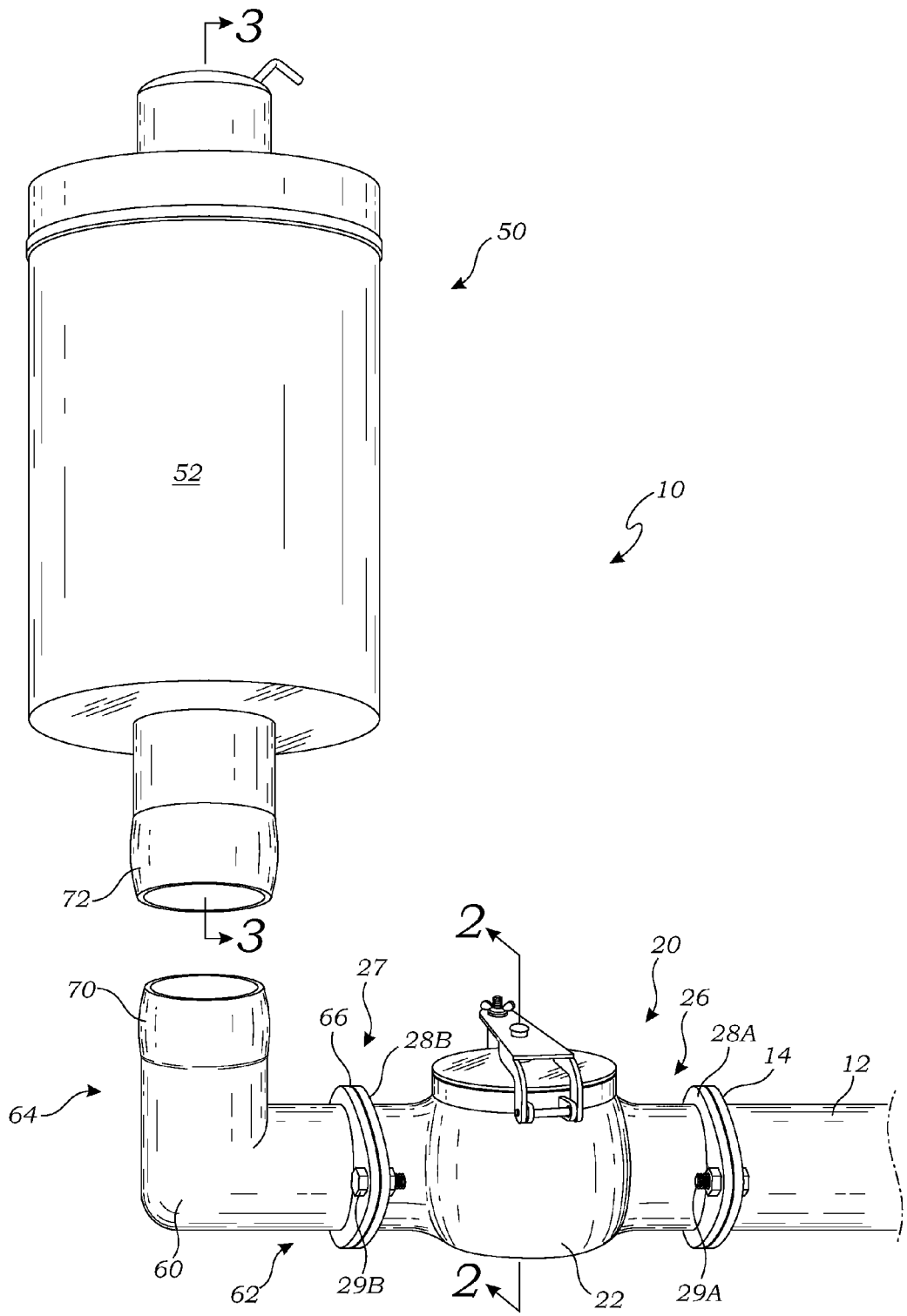
FIG. 1 is an exploded perspective view of a combination relief valve and filtration system, according to one embodiment of the present invention.

FIG. 1 is an exploded perspective view of the combination 10, according to one embodiment of the present invention. As illustrated in FIG. 1, the combination 10 includes a relief valve 20 and a filtration system 50. The relief valve 20 is operably installed on the hydrocarbon distribution system 12 for venting gasses from the hydrocarbon distribution system 12, and the filtration system 50 is mounted on a relief valve 20 for filtering pollutants from the gasses as they are vented. In this manner, venting needs are accommodated without releasing the pollutants, and without requiring a complex and expensive collection mechanism.

In the embodiment of FIG. 1, the relief valve 20 and the filtration system 50 are removably connected via a connection conduit 60. As illustrated in FIG. 1, the connection conduit 60 connects the filtration system 50 with the relief valve 20 such that gasses vented from the hydrocarbon distribution system 12 through the relief valve 20 are directed into the filtration system 50, and particularly into the inlet chamber 54 and through the pollution filter 58, as illustrated in FIG. 3 and as discussed in greater detail below.

Figure 2:
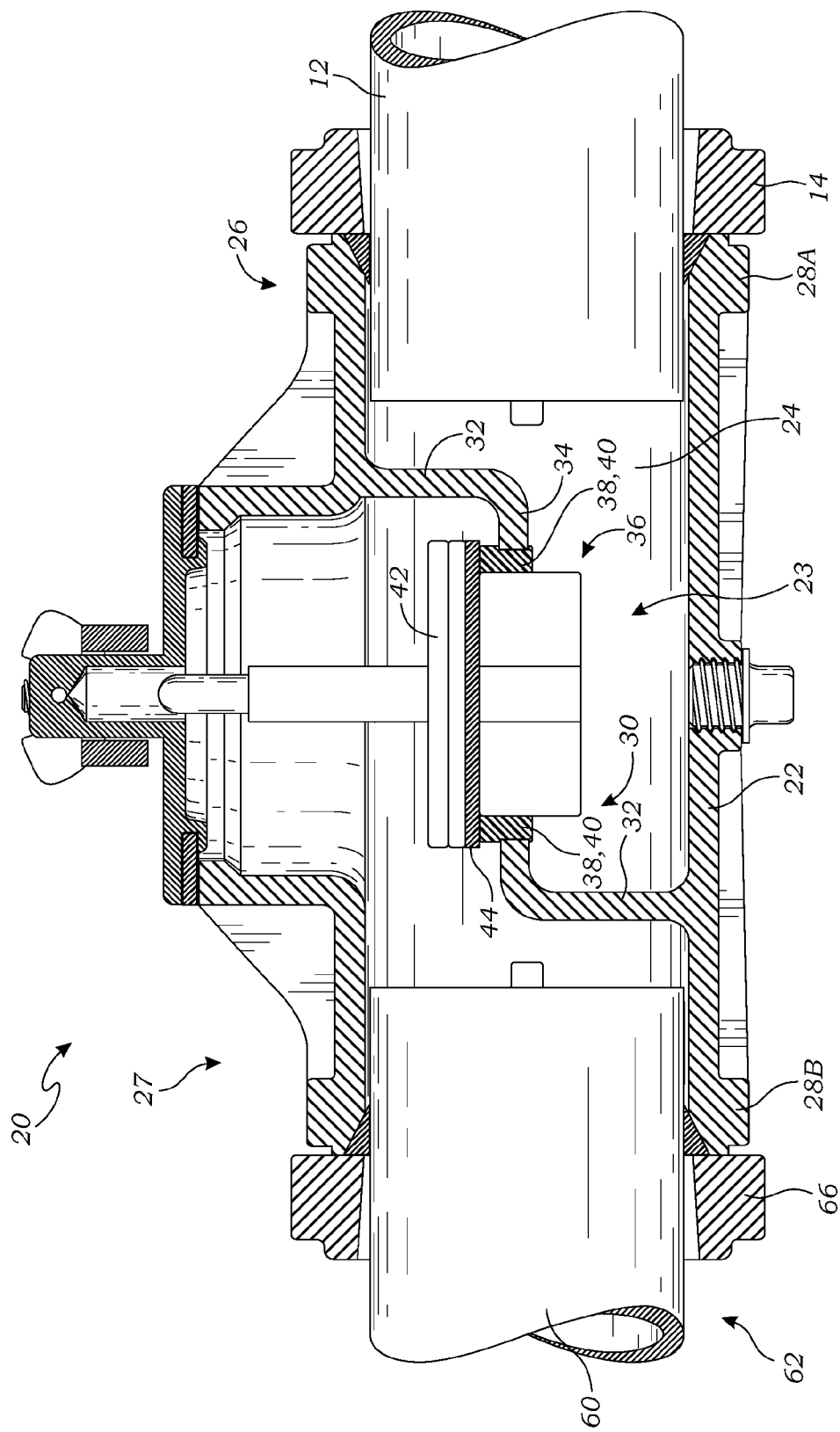
FIG. 2 is a sectional view of the relief valve taken along line 2-2 in FIG. 1.

FIG. 2 is a side elevational sectional view of the relief valve 20. As illustrated in FIGS. 1 and 2, the relief valve 20 comprises a valve housing 22 that includes a through conduit 24 therethrough. The valve housing 22 has a system end 26 and a filter end 27, the system end 26 being adapted to be attached to the hydrocarbon distribution system 12, and the filter end 27 being adapted to be attached to the filter housing 52. A valve mechanism 23 blocking the through conduit 24 selectively allows gasses to vent through the relief valve 20 when pressure within the hydrocarbon distribution system 12 reaches a certain threshold. In the preferred embodiment, the valve mechanism 23 does not allow gasses to flow in the reverse direction, thereby allowing vacuum or low pressure conditions to be maintained within the hydrocarbon distribution system 12 without reverse flow through the relief valve 20.

In one embodiment, the valve mechanism 23 includes an inner wall 30 that blocks the through conduit 24. The inner wall 30 may include two vertical portions 32 connected by a horizontal portion 34. An aperture 36 through the horizontal portion 34 has a perimeter 38 with a pressure seat 40, and is adapted to receive a pressure weight 42 having a gasket 44 that is shaped to seal against the pressure seat 40 when the pressure weight 42 is positioned over the aperture 36. The pressure weight 42 and the gasket 44 together seal the aperture 36, unless the pressure of the gasses is enough to lift the pressure weight 42 off of the pressure seat 40, thereby venting the gasses through the relief valve 20.

The relief valve 20 may include attachment elements 28A and 28B that are adapted to be attached to the hydrocarbon distribution system 12 and to the connection conduit 60, respectively. In the embodiment of FIGS. 1 and 2, the attachment elements 28A and 28B are flanges that are adapted to be attached with bolts 29A an 29B to an attachment flange 14 of the hydrocarbon distribution system 12, and to a distal connector 66 (in this embodiment, a matching flange). While these types of flanges represent one option of attaching the relief valve 20, alternative and/or equivalent attachment elements may also be used, and should be considered within the scope of the present invention.

FIG. 3 is a side elevational sectional view of the filtration system 50. As illustrated in FIGS. 1 and 3, the filtration system 50 includes a filter housing 52 and a pollution filter 58 mounted therein. The filter housing 52 has an inlet chamber 54 having openings 56 through the inlet chamber 54. The pollution filter 58 is positioned within the filter housing 52 adjacent the inlet chamber 54 to cover the openings 56. The pollution filter 58 is adapted to remove the pollutants from the gasses.

In one embodiment, the filter housing 52 may be a rigid, generally cylindrical housing, although a wide variety of shapes and constructions may be utilized. The inlet chamber 54 may be an elongate tubular construction positioned within the filter housing 52, although other shapes and dispositions may be devised by those skilled in the art, and should be considered within the scope of the present invention. The openings 56 of the inlet chamber 54 may extend entirely around the elongate tubular construction; although, in alternative embodiments, they may be positioned only on a certain face of a wall (not shown), or in any other arrangement considered acceptable to those skilled in the art.

In the embodiment of FIGS. 1 and 3, the pollution filter 58 has an inwardly extending bore 55 shaped to receive the elongate inlet chamber 54 therein so that the pollution filter 58 completely surrounds the inlet chamber 54 and covers the openings 56. In this embodiment, the pollution filter 58 includes an outer layer 58 (e.g., a fibrous or fabric layer, or equivalent covering material or shell) that surrounds an inner core 59 that is adapted to remove the pollutants. The inner core may be, for example, an activated charcoal that is suitable for removing organic wastes, benzene, and other pollutants. In one embodiment, the inner core is composed of granulated activated charcoal, such as GAC-48C, GAC-48C-AW, or similar granulated activated charcoal known in the art. One type of acceptable granulated activated charcoal is sold under the name OIL GRAB™ by Hydrocarbon Absorbent Technologies, Inc.

As illustrated in FIGS. 1 and 3, the connection conduit 60 includes an attachment mechanism for removably attaching the filter housing 52 to the relief valve 20. In one embodiment, the connection conduit 60 includes a first quick-release fitting 70, and the valve housing 22 includes a second quick-release fitting 72 in fluid communication with the inlet chamber 54 and shaped to removably engage the first quick-release fitting 70 to bring the inlet chamber 54 into fluid communication with the relief valve 20. When the gasses vented through the relief valve 20 flow through the connection conduit 60, they are directed through the first and second quick-connect fittings, into the inlet chamber 54, and out through the pollution filter 58.

In one embodiment, the first and second quick-release fitting 70 and 72 are cam-lock fittings that enable the first and second quick-release fitting 70 and 72 to be easily connected and disconnected with a simple locking movement, and do not require tools and/or significant time to connect and disconnect. In this manner, a relatively unskilled worker can quickly and easily remove the filtration system 50 once it has been used for some time, and replace it with a fresh filtration system 50. The old and contaminated filtration system 50 is then transported to a suitable facility where the pollution filter 58 may be removed and replaced, without exposing the workers to the pollutants, which can sometimes be toxic.

In the embodiment of FIGS. 1 and 3, an outlet chamber 80 is formed between the filter housing 52 and the pollution filter 58. Once the vented gasses have passed through the pollution filter 58, they pass into the outer chamber 80, from which they can vent to the outside air. In the present embodiment, the gasses are directed through a top plate 82 of the filtration system 50.

FIG. 4 is a top plan view of the top plate 80 of one embodiment of the filtration system 50. As illustrated in FIG. 4, the top plate 80 includes a plurality of vent apertures 84 adjacent a plate perimeter 85, for venting the filtered gasses through vents 86 to the atmosphere.

The terminology used in the specification provided above is hereby defined to include similar and/or equivalent terms, and/or alternative embodiments that would be considered obvious to one skilled in the art given the teachings of the present patent application. Additionally, the words "a," "an," and "one" are defined to include one or more of the referenced item unless specifically stated otherwise. Also, the terms "have," "include," "contain," and similar terms are defined to mean "comprising" unless specifically stated otherwise.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A filtration system adapted to be mounted on a hydrocarbon distribution system for filtering pollutants from gasses vented from the hydrocarbon distribution system, the filtration system comprising:
 a filter housing;
 an elongate tubular inlet chamber extending into the filter housing, the inlet chamber having a plurality of openings;
 a pollution filter positioned within the filter housing, the pollution filter having an inwardly extending bore shaped to receive the elongate tubular inlet chamber therein so that the pollution filter covers the plurality of openings of the elongate tubular inlet chamber;
 activated charcoal within the pollution filter for removing the pollutants from the gasses passing through the pollution filter; and
 a connection conduit for connecting the filter housing with the hydrocarbon distribution system so that gasses vented from the hydrocarbon distribution system are directed into the inlet chamber and through the pollution filter.

2. A combination relief valve and filtration system for removing pollutants from gasses vented from a hydrocarbon distribution system, the combination comprising:
 a relief valve comprising:
  a valve housing having a through conduit therethrough, the valve housing having a system end and a filter end, the system end of the valve housing being adapted to be attached to the hydrocarbon distribution system;
  an inner wall that blocks the through conduit, the inner wall having two vertical portions connected by a horizontal portion;
  an aperture through the horizontal portion, the aperture having a perimeter with a pressure seat; and
  a pressure weight having a gasket, the gasket being shaped to seal against the pressure seat when the pressure weight is positioned over the aperture, such that the pressure weight and the gasket together seal the aperture, unless the pressure of the gasses is enough to lift the pressure weight off of the pressure seat, thereby venting the gasses through the relief valve;
 a connection conduit having a distal end and a proximal end, the distal end having a distal connector that is adapted to be operably connected to the filter end of the relief valve, and the proximal end having a first quick-release fitting;
 a filter housing comprising:
  an elongate tubular inlet chamber within the filter housing, the inlet chamber having openings;
  a pollution filter positioned within the filter housing, the pollution filter having an inwardly extending bore shaped to receive the elongate inlet chamber therein so that the pollution filter covers the openings of the inlet chamber; and
  a second quick-release fitting in fluid communication with the inlet chamber and shaped to removably engage the first quick-release fitting to bring the inlet chamber into fluid communication with the relief valve through the connection conduit; and
 wherein the gasses vented through the relief valve flow through the connection conduit, through the first and second quick-connect fittings, into the inlet chamber, and out through the pollution filter.

* * * * *